May 5, 1959  T. E. GANNOE  2,885,117
MICA FEED APPARATUS
Filed April 8, 1954  2 Sheets-Sheet 1

INVENTOR
THOMAS E. GANNOE
BY
Michael Hertz
ATTORNEY

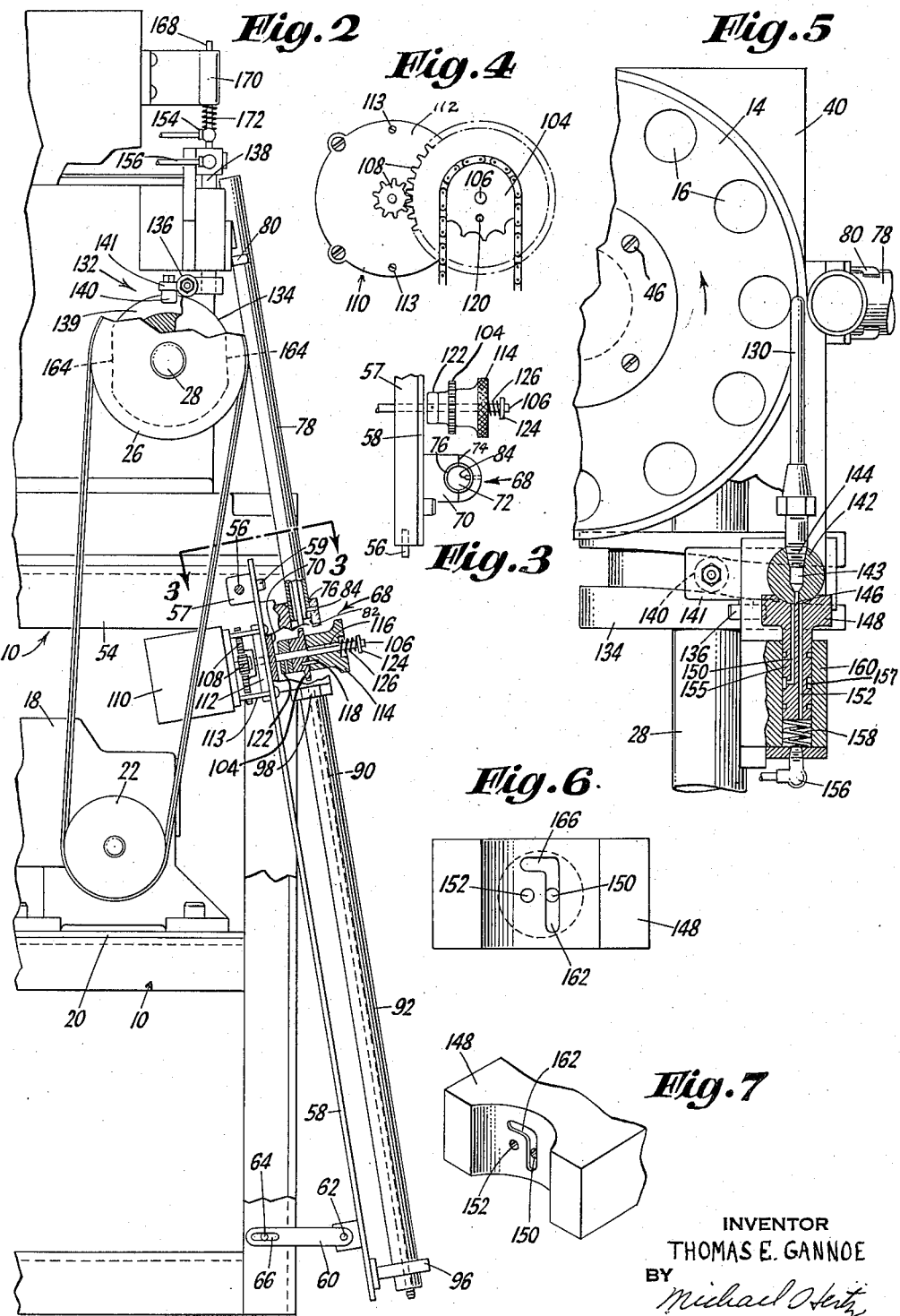

United States Patent Office 2,885,117
Patented May 5, 1959

2,885,117

MICA FEED APPARATUS

Thomas E. Gannoe, Warren, Pa., assignor to Sylvania Electric Products Inc., a corporation of Massachusetts Application April 8, 1954, Serial No. 421,751

9 Claims. (Cl. 221—211)

This invention relates to transfer mechanism and particularly to mechanism to transfer a top mica of a stack of micas in a tube to pockets in a horizontal rotatably indexable annular turret plate provided with peripheral equally spaced pockets.

It is an object of this invention to provide means whereby the micas may be prestored in a package and automatically removed from said package and placed directly on the turret for gauging and processing.

It is a still further object of the invention to provide simple means for effecting removal of a single mica from the stack for transfer to the turret and for positively stripping the mica so transferred from the transfer means for automatic disposition of the same in a pocket in the turret plate.

It is a further object of the invention to provide novel means to control the pick up and stripping action of the transfer means.

It is yet another object of the invention to provide novel feed means for advancement of the micas in the storage tube.

These and other objects will become apparent after reading the following specification and claims in conjunction with the accompanying drawings in which Fig. 1 is a front elevation of the machine, partly in section.

Fig. 2 is a side elevation of the machine, parts being shown in section and a portion of the machine not pertinent to the invention being broken away.

Fig. 3 is a section on the line 3—3 of Fig. 2 of a portion of the machine.

Fig. 4 is a detail of a portion of the mechanism employed to advance the stack of micas to the transfer mechanism.

Fig. 5 is a view of a portion of the transfer mechanism, showing, in section, valve control mechanism which controls the admission of gaseous fluid to the transfer mechanism, and Figs. 6 and 7 are end and fragmental perspective views, respectively, of a ported valve block.

Figure 1:
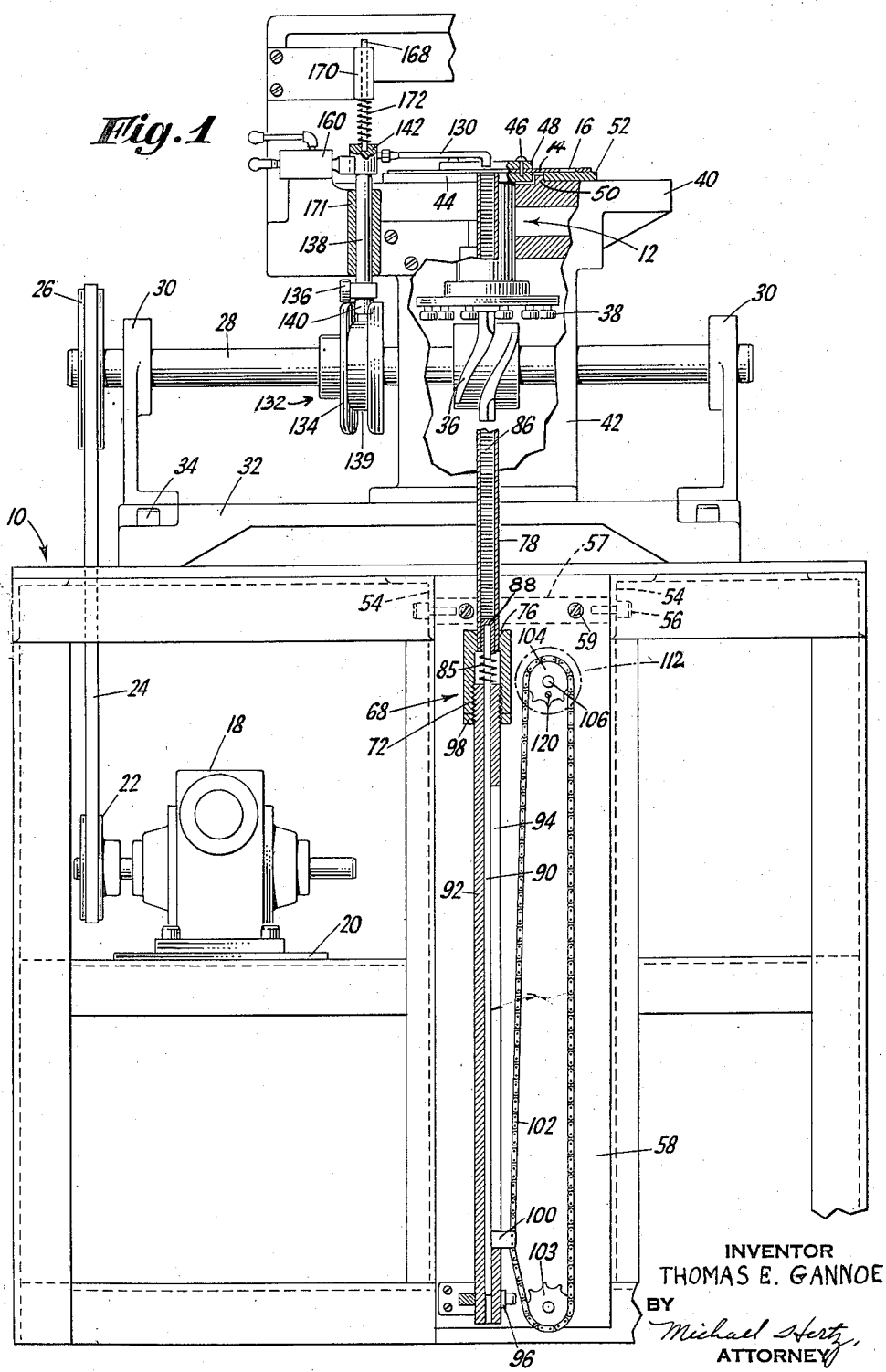

Referring to the figures more in detail, at 10 there is generally indicated the standard of the machine. The machine is provided with a rotatable turret indicated generally at 12 surmounted by an annular plate or disc 14 provided with circumferential equally spaced circular recesses or pockets 16, near the periphery of the disc. The turret is indexed to enable the micas to be gauged as to thickness and to enable mechanism to eject micas of improper thickness. Subsequently, the turret is indexed to bring the micas to a mica piercing station whereat the micas are perforated in a desired pattern. Upon further indexing movement of the turret, the gauged and pierced micas are ejected from the disc. Since this invention relates to mica feed mechanism and to means for transferring micas from a supply tube to the recesses in the plate, the other parts of the machine are not shown.

Means to index the turret and plate includes a motor 18 mounted on a platform 20 bridging the legs of the stand. The motor has a pulley 22 driving a belt 24 which in turn drives a pulley 26 on a shaft 28 supported in bearings 30. The bearings are on a bed plate 32 suitably fastened as by screws 34 onto the standard 10. This shaft has fastened thereto a worm cam 36 engaging circumferential equally spaced roller bearing pins 38 on the bottom of turret 12. The worm will therefore drive the turret in step-by-step fashion. The turret finds bearing in a table top 40 on the pedestal 42, said pedestal being suitably secured to the bed plate 32. If desired ball bearings may be inserted between the turret and the table top. Surmounting the turrent and fast therewith is the cap 44 and clamped, as by screws 46, between the cap and a hold down plate 48 is the annular disc 14.

Fitted around an annular ridge 50 forming part of the table top is a fixed annular bearing plate 52 on which the disc 14 rides as it is indexed. A mica disc positioned in a pocket 16 will ride on the plate as the disc is indexed.

Spanning the standard are two webs 54 and pivoted to these webs as by pivot pins 56 is a bar 57 to which a tilt plate 58 is secured, as by screws 59. This tilt plate may be angularly adjusted for reasons to be described later by means of a link 60 pivoted at 62 to the lower end of the tilt plate, said link having a slidable connection, as by the bolt 64 and slot 66 in the link, with the standard 10.

Mounted on the upper portion of the tilt plate is a hollow coupling block 68. This block has a base portion 70 secured to the plate 58 and a tubular portion 72. The top of the tubular portion is stepped as shown at 74 and the top of the block has an internal beveled face 76. The stepped down portion and beveled face are provided for the purpose of facilitating the insertion of a mica containing tube 78 which may be inserted into the block at a convenient angle of handling, as vertically, and then tilted until its upper end is engaged by a spring clip 80 mounted on the machine. The lower end of the tube has a bayonet slot 82 for coaction with a pin 84 extending inward of the tubular portion for locking the tube in place and a spring 85 maintains the bayonet joint in engagement. The bolt and slot connection 64, 66 at the bottom of the plate is provided to enable the angularity of the plate 58 and tube 78 to be adjusted so that the upper edge of the tube may be located as close as desired to the periphery of the plate 14 with the upper end of the tube substantially on a level with the bottom of the plate. Within the tube is packed a pile of mica discs 86. These micas are the micas to be processed by the machine and are of a diameter to be snugly received by the tube. While the micas are stacked in the tube fairly tightly, the nature of the packing is such that the pile may be compressed slightly with very little effort, perhaps due to the cushioning action of air between individual micas or between micas here and there in the pile. The importance of this characteristic will be disclosed later on. At the bottom of the tube is a readily displaceable thimble 88, with the bottommost mica resting on the thimble. Operating to thrust the thimble 88 upward, and with it the pile of micas, is a thrust rod 90 slidable within a guide tube 92 slotted longitudinally at 94, said tube being screw threaded into the bottom of the tubular portion 72. The bottom end of the guide tube is retained in a clamp ring or block 96 of any suitable character. To lock the upper end of the guide tube in place in the coupling block 68 a conventional lock nut 98 is employed. The rod 90, at its lower end, is provided with a lug 100 fixedly secured to a chain 102 trained over an idler sprocket 103 suitably rotatably mounted on the lower end of plate 58 and over a drive sprocket 104 at the upper end of the plate, rotatable at times, on the counter shaft 106. The counter shaft is slowly rotated through reduction gearing 108 by a constantly driven motor 110. The reduction gearing is interposed between the motor 110 and a suitable cover plate 112 mounted on studs 113 passing through the plate 58 and threaded into the motor housing. As stated heretofore the drive sprocket 104 is, at times, rotatable on the shaft 106 but is driven thereby by a knurled knob 114 splined at 116 on the shaft for longitudinal movement along the shaft and provided with a pin 118 screw threaded into the knob and engageable in a hole 120 in the drive sprocket 104. A collar 122 secured to the counter shaft 106, as by a set screw, limits motion of the sprocket toward the plate 58 and a second collar 124 and spring 126 urge the knob into engagement with the sprocket 104.

During normal operation the pin 118 is engaged in the hole 120 in the drive sprocket and the chain is slowly driving the thrust rod 90 upward to feed micas to the upper edge of the tube 78. After the tube has been emptied of the micas, or wherever desired to replace a tube 78 by another filled tube, the knob 114 may be withdrawn against the action of spring 126 until the pin 118 is disengaged from the hole in the drive sprocket. The lug 100 on the rod 90 may then be manually operated to bring the rod to its lowermost position, whereupon the knob is again released and parts adjusted to engage its pin with the drive sprocket. The speed of the motor, the reduction gearing and the drive sprocket sizes are chosen so as to feed the mica pile up the tube at just a very slightly greater rate than they are removed from the upper level of the tube. However, because of the transfer mechanism employed to remove micas from the top of the pile and place them individually in pockets 16 and the nature of the material fed upward in the tube 78, the top of the mica pile is kept at a fixed level, as will be explained.

The transfer means includes a horizontally oscillatable and vertically reciprocable nozzle 130 and control mechanism therefor. The movement of the nozzle is controlled by a dual cam means 132 fast on the shaft 28. One of the cam means is a lift cam 134 coacting with a cam follower roller 136 secured in any desirable manner to the rod 138. The other of the cam means is a barrel cam having a raceway 139 coacting with a cam follower 140 on an arm 141 extending radially from the axis of rod 138 and operative to oscillate the rod about its vertical axis. The upper end of this rod is secured to a cylindrical valve 142 having a straight through horizontal passage 143, with the nozzle 130 threaded into an enlargement 144 of the passage and a port 146 at the other end of the passage. Cooperating with the valve is the valve shoe 148 having two parallel passageways 150 and 152 both lying in a horizontal plane, the passageway 150 being connected via pipe 154 and a circular groove 157 around the stem 155 of the shoe to a source of suction and the passageway 152 being connected via pipe 156 to a source of gaseous fluid under pressure. The shoe is resiliently pressed against the valve 142 by a spring 158, the shoe having its stem coacting with the spring, and the spring and stem being suitably mounted in box 160 mounted on the frame of the machine. The shoe has a cylindrical face coacting with the cylindrical valve 142 and on this face there is an L-shaped recess 162 of which a vertical leg is in communication with suction passageway 150. A horizontal leg of the recess extends over but is not in communication with the pressure passageway 152.

The vertical lift cam 134 has two low portions 164 so that for every complete cycle of movement of the nozzle 130 from mica pick up position over tube 78 to mica blow off position over a pocket 16, and back, the nozzle will be lowered twice, once over the tube 78 and again over a pocket 16. The recess 162 is so shaped that suction is applied to the nozzle during the upward movement of the nozzle from off the tube 78 and while it is oscillating laterally to a position above a pocket 16, but the suction is cut off on descent of the nozzle from the left hand position 166 of the recess down to a position close to the pocket whereat the port 146 communicates with the pressure inlet passageway 152. In this last position, the micas will be blown off the pick up nozzle and deposited in a pocket. The valve is guided in its vertical movement by a stem 168 slidable in a fixed bearing 170, and by the bearing 171 surrounding the rod 138. Interposed between the bearing 170 and the valve is a spring 172 which forces the follower 136 into contact with the cam 134 and further forces the nozzle 130 with its downwardly turned free end into contact with the topmost mica in the tube 78, forcing the same down into the tube if too high in the tube, by reason of the compressibility of the mass of mica discs in the tube. Thus the micas because of the slow excess of upward feed of the stack of micas in the tube and by reason of the compression of the stack due to nozzle action under influence of the spring 172, are maintained at a constant upper level.

Summarizing the operation of the device, after a tube 78 has been exhausted of all of its micas, the knob 114 is withdrawn against the action of spring 126, withdrawing the pin 118 from the hole 120 in the driving sprocket 104. The motor 110 may or may not be stopped, at will. The lug 100 may be now engaged by the operator and lowered to the position shown in Fig. 1, thus lowering the rod 90 and the thimble 88. The exhausted tube 78 may then be brought to an erect position by detachment from the spring clip 80 and the tube detached at its bayonet joint within the block 68 and lifted out and away from the machine. A new tube 78 is loaded into the block 68 and canted over into engagement with the clip 80. The knob 114 being released, and the motor 110 running, engagement of pin 118 with the hole 120 in sprocket 104 is effected and the chain 102 and lug 100 now drive the rod 90 and thimble 88 upwardly moving the entire pile of micas upwardly.

The micas are removed one by one from the top of the pile of micas stored in the tube and fed to the openings 16 in the indexible turret by the nozzle 130. The tip of the nozzle travels back and forth in a sort of inverted U path between the tube 78 and an opening 16. The nozzle when down on the micas in tube 78 will be subjected to suction via the passageway 143 (see Figs. 5, 6 and 7) in valve 142, port 146, the lower portion of L-shaped recess 162 in valve shoe 148, passageways 150 and 157 and suction pipe 154. The valve 142 is constrained to vertical motion and rotational movement only, by the extension 168 from the bearing riding in bearing 170, the spring 172 serving to hold the valve down. The rod 138 which is a lower extension of the valve also rides in the bearing 171. The roller 136 on the lower end of the rod is raised by the cam 134 lifting the nozzle with an adherent mica while the port 146 rides along the vertical leg of the recess 162 wherefore suction is maintained on the nozzle. The nozzle is then oscillated by operation of roller 140 in the camway 139 and by reason of arm 141 attached to rod 138 to bring the nozzle from over the tube 78 to over an opening 16, while suction is maintained on the nozzle by reason of the horizontal arcuate run 166 of the recess 162 with the port 146 in the valve riding along the run 166. As the cam 134 rotates, the cam follower 136 will be pressed downward to a low part 164 of the cam thereby causing the port 146 to travel over a blank portion of arcuate shoe 148 toward the passageway 152. Therefore as the nozzle moves down, the suction in the conduit leading to the mica at the end of the nozzle will be trapped until the nozzle moves down far enough to bring port 146 and passageway 152 into communication; then compressed air led to the passageway via pipe 156 will blow the mica disc into the opening 16. It will be clear from this explanation how the nozzle retraces its path with attendant change of pressure at the nozzle tip from pressure to suction currents. The downward travel of the nozzle to pick up a mica is such as to cause the micas in the tube to be compressed between the nozzle tip and the thimble 88 to squeeze out the air between the mica laminations and between the micas, and the feed of the motor 110 is made fast enough to compensate for the resulting compression of the pile, and to maintain the top of the pile at a height such that the nozzle will be effective in removing micas from the pile. After a tube of micas is exhausted, it is replaced by another tube, as previously described.

Having thus described the invention, what is claimed is:

1. In an article handling means, a guide for stacked articles, means for advancing articles along said guide toward one end thereof, a displaceable conveyor provided with pockets for reception of individual articles, a nozzle, means mounting said nozzle for rotational movement about an axis parallel to the direction of movement of the articles along the guide for transferring articles from said end of the guide to the pockets, means for moving said nozzle vertically rectilinearly parallel to said axis into contact with the top article in the stack, means for applying suction on the nozzle while moving said nozzle vertically rectilinearly away from the stack and pivotally toward a pocket, and means for moving said nozzle and article vertically rectilinearly toward said pocket, for cutting off the suction and applying pressure fluid to the nozzle, said advancing means operating to drive the articles upwardly through the guide at a rate slightly greater than the removal thereof from the stack.

2. A valve mechanism comprising a valve element having a cylindrical surface and a nozzle extending from the element, said element being provided with a port in the cylindrical surface thereof, a duct in the element leading therefrom to the nozzle, a valve block provided with a concave cylindrical surface, an inverted L-shaped recess in the concave face of the block with one leg of the recess parallel to an element of the cylindrical surface and the other leg substantially perpendicular thereto and running in the arc of a circle, a port in the block adapted to lead to a source of fluid under suction communicating with the L-shaped recess, a second port in the block spaced laterally of the first leg and below the end of the arcuate leg, said second port being adapted to communicate with a source of fluid under pressure, and means holding said valve element and block in cooperative relationship, and means for moving said valve element rectilinearly in a direction parallel to the first leg of the recess and rotatably with respect to said valve block.

3. A vertical guide for stacked mica articles, means for advancing said articles along said guide toward the upper end thereof, means for removing micas from the top of the stack in the guide, one by one, said means prior to removal of a mica engaging the mica and depressing it with respect to the tube to a fixed level, and constantly moving motor driven means operative at the bottom of the stack of micas tending to drive the micas upwardly through the tube at a rate slightly greater than the rate of removal of the micas from the top of the tube.

4. An apparatus for transferring micas from an open ended vertical supply tube, wherein the micas are stacked, to a conveyor provided with pockets said apparatus comprising a guide tube into the upper end of which is connected the supply tube, a thrust rod vertically movable in said tube, motor means for driving said rod to advance the micas in the tube at a rate slightly in excess of the rate of removal of the micas from the tube, and a vertically movable and horizontally oscillatable suction and pressure nozzle movable vertically into depressive engagement with the micas to compact the micas on downward movement of the nozzle and to carry off with it a top mica upon upward vertical movement and oscillation of the nozzle preparatory to depositing the mica in one of said pockets.

5. An apparatus for transferring micas from an open ended vertical supply tube, wherein the micas are stacked, to a conveyor provided with pockets, said apparatus comprising a vertically slotted guide tube into the upper end of which is connected the supply tube, a thrust rod vertically movable in said slotted tube, a lug on said rod extending through the slot, an endless conveyor connected with said lug to shift the same, readily disconnectible motor means for driving said conveyor and a vertically movable and horizontally oscillatable suction and pressure nozzle movable vertically into depressive engagement with the micas to compact the micas on downward movement of the nozzle and to carry off with it a top mica upon upward vertical movement and oscillation of the nozzle preparatory to depositing the mica in one of said pockets.

6. An article handling means comprising means for supporting a stack of articles and elevating the stack as top articles are removed therefrom, a conveyor having pockets for reception of individual articles from the stack, a vertical oscillatable shaft parallel to the direction of movement of the stacked articles, means for vertically reciprocating the shaft and for oscillating it about its vertical axis, an air conduit fastened to said shaft extending laterally therefrom and terminating in a downwardly extending suction nozzle, said nozzle being movable between positions where it is above the stack and above a pocket in the conveyor, and means for applying suction to said conduit while moving said nozzle vertically rectilinearly away from the stack and pivotally toward a pocket and for cutting off the suction and applying pressure to the nozzle when over the pocket, said supporting and elevating means operating to drive the articles upwardly at a rate slightly greater than the removal thereof from the stack.

7. A valve mechanism comprising a valve element having a cylindrical surface and a nozzle extending from the element, said element being provided with a port in the cylindrical surface thereof, a duct in the element leading therefrom to the nozzle, a valve block provided with a concave cylindrical surface, an inverted L shaped recess in the concave face of the block with one leg of the recess parallel to an element of the cylindrical surface and the other leg substantially perpendicular thereto and running in the arc of a circle, a port in the block adapted to lead to a source of fluid under suction communicating with the L shaped recess, a second port in the block spaced laterally of the first leg and below the end of the arcuate leg, said second port being adapted to communicate with a source of fluid under pressure, means holding said valve element and block in cooperative relationship, and means for moving said valve element rectilinearly in a direction parallel to the first leg of the recess and rotatably with respect to said valve block, said means comprising a rod extending from a base of the valve, a cam follower fixed to said rod on the free end thereof, rotatable cam means cooperating with the follower to raise and lower the same and with it the rod and valve element, a second cam follower offset from the rod on an arm fast with the rod, and a second cam cooperating with said cam follower to oscillate the arm and thereby the rod and valve element.

8. A valve mechanism comprising a valve element having a cylindrical surface and a nozzle extending from the element, said element being provided with a port in the cylindrical surface thereof, a duct in the element leading therefrom to the nozzle, a valve block provided with a concave cylindrical surface, an inverted L shaped recess in the concave face of the block with one leg of the recess parallel to an element of the cylindrical surface and the other leg substantially perpendicular thereto and running in the arc of a circle, a port in the block adapted to lead to a source of fluid under suction communicating with the L shaped recess, a second port in the block spaced laterally of the first leg and below the end of the arcuate leg, said second port being adapted to communicate with a source of fluid under pressure, means holding said valve element and block in cooperative relationship, and means for moving said valve element rectilinearly in a direction parallel to the first leg of the recess and rotatably with respect to said valve block, said means comprising a rod extending from a base of the valve, a cam follower fixed to said rod on the free end thereof, a second cam follower offset from the rod on an arm fast with the rod, a drive shaft, a combined lift and barrel cam mounted on said shaft cooperating with the two followers to effect vertical and oscillatory movements of the rod and valve elements, and spring means to urge the rod in a direction toward the lift cam.

9. Mica feed and transfer mechanism comprising a tube containing a stack of micas, means for removing micas from the top of the stack, one by one, said means prior to removal of a mica engaging the mica and depressing it with respect to the tube to a fixed level, and means operative at the bottom of the stack of micas tending to drive the micas upwardly through the tube at a rate slightly greater than the rate of removal of the micas from the top of the tube, said last named means comprising a guide element connected with the tube and extending therebelow, a thrust rod rectilinearly movable in the guide element having an end entering the supply tube for advancing the articles in the tube, means for driving said rod comprising a motor, a shaft driven by said motor and a pull knob splined on said shaft, a pin extending from said knob and extending parallel to said shaft, an element rotatable on the shaft having an aperture in which said pin is adapted to engage, means resiliently urging said knob and pin toward the rotatable element, and means coupling said rotatable element with said rectilinearly movable rod to transfer motion of the rotatable element to the rod, the knob and pin being retractible against the action of the spring to enable resetting of the rod to an initial position withdrawn from the tube.

References Cited in the file of this patent
UNITED STATES PATENTS

| | | |
|---|---|---|
| 335,095 | Stevenson | Jan. 26, 1886 |
| 505,858 | Smyser | Oct. 3, 1893 |
| 1,331,417 | Cowan | Feb. 17, 1920 |
| 1,591,312 | Hoag | July 6, 1926 |
| 1,663,510 | Wessman | Mar. 20, 1928 |
| 1,794,834 | Cavin | Mar. 3, 1931 |
| 1,942,885 | Tevander | Jan. 9, 1934 |
| 1,982,273 | Vogel et al. | Nov. 27, 1934 |
| 2,313,128 | Densten | Mar. 9, 1943 |
| 2,417,938 | Krueger | Mar. 25, 1947 |
| 2,551,477 | Vore | May 1, 1951 |
| 2,621,994 | Sadler | Dec. 16, 1952 |
| 2,670,173 | Stehlin | Feb. 23, 1954 |